(12) United States Patent
Nishiyama et al.

(10) Patent No.: US 10,227,060 B2
(45) Date of Patent: Mar. 12, 2019

(54) VEHICLE CONTROL DEVICE

(71) Applicant: TOYOTA JIDOSHA KABUSHIKI KAISHA, Toyota-shi, Aichi-ken (JP)

(72) Inventors: Shigeki Nishiyama, Nagoya (JP); Tomoyuki Funayama, Toyota (JP); Yuuto Kameyama, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/963,649

(22) Filed: Apr. 26, 2018

(65) Prior Publication Data

US 2018/0361990 A1 Dec. 20, 2018

(30) Foreign Application Priority Data

Jun. 15, 2017 (JP) .................................. 2017-117817

(51) Int. Cl.
*B60R 25/24* (2013.01)
*B60R 25/01* (2013.01)
*H04B 1/04* (2006.01)

(52) U.S. Cl.
CPC .............. *B60R 25/24* (2013.01); *B60R 25/01* (2013.01); *B60R 2325/103* (2013.01); *H04B 1/04* (2013.01)

(58) Field of Classification Search
CPC ... B60R 25/24; B60R 25/01; B60R 2325/103; H04B 1/04; E05B 81/77; E05B 81/62
See application file for complete search history.

(56) References Cited

U.S. PATENT DOCUMENTS

| 6,281,599 B1 | 8/2001 | Murakami et al. |
| 2017/0152687 A1* | 6/2017 | Koizumi ................. E05B 81/77 |
| 2018/0066460 A1* | 3/2018 | Koizumi ................. E05B 81/77 |

FOREIGN PATENT DOCUMENTS

| JP | 2000-017916 A | 1/2000 |
| JP | 2012-154118 A | 8/2012 |
| RU | 2168278 C2 | 5/2001 |

\* cited by examiner

*Primary Examiner* — Nabil H Syed
(74) *Attorney, Agent, or Firm* — Oliff PLC

(57) ABSTRACT

A vehicle control device configured to perform transmission of a drive signal for driving an antenna and reception of a detection signal from a sensor detection unit configured to detect a user operation by common wire, and a controller configured to control the antenna driving unit to transmit the drive signal. The controller is configured to determine whether the determination process is being performed by the sensor detection signal determination unit each when the antenna driving unit transmits the drive signal. The controller is configured to cause the antenna driving unit to transmit the drive signal after the sensor detection signal determination unit finishes the determination process in a case where the controller determines that the determination process is being performed by the sensor detection signal determination unit.

8 Claims, 5 Drawing Sheets

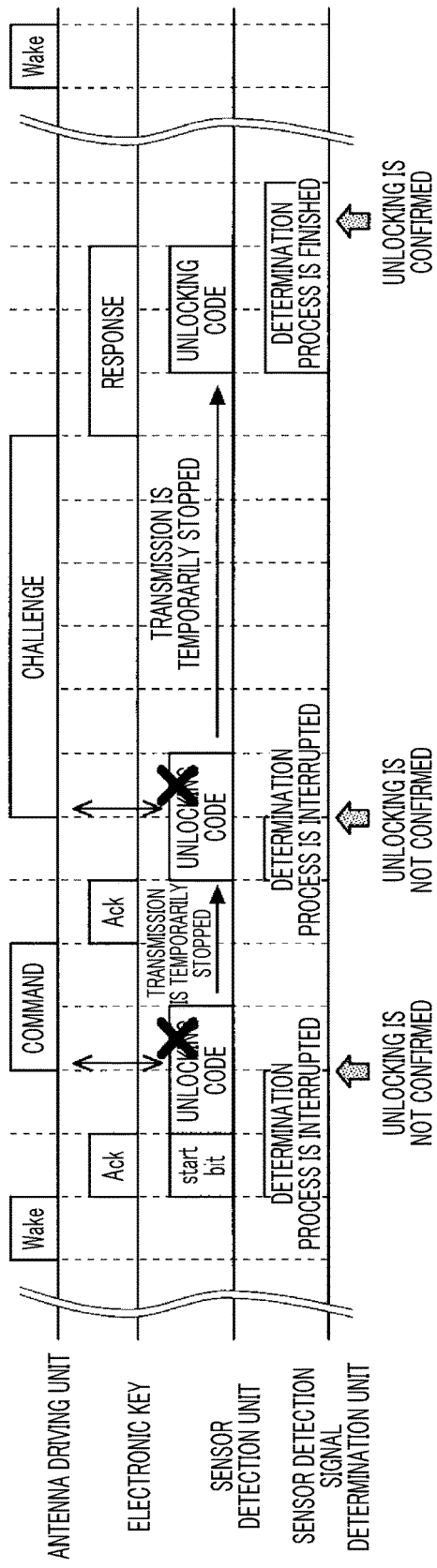

VEHICLE CONTROL DEVICE

INCORPORATION BY REFERENCE

The disclosure of Japanese Patent Application No. 2017-117817 filed on Jun. 15, 2017 including the specification, drawings and abstract is incorporated herein by reference in its entirety.

BACKGROUND

1. Technical Field

The present disclosure relates to a vehicle control device installed in a vehicle.

2. Description of Related Art

A vehicle system in which an electronic key carried by a user and an in-vehicle device installed in a vehicle control the vehicle through wireless communication is known. In the above-described vehicle system, the electronic key and the in-vehicle device transmit and receive a predetermined signal via an antenna and the in-vehicle device authenticates the electronic key through a collation process or the like with respect to predetermined identification information. The vehicle is controlled via predetermined operation input with respect to the vehicle after the authentication of the electronic key.

For example, Japanese Unexamined Patent Application Publication No. 2012-154118 (JP 2012-154118 A) discloses a vehicle system in which an in-vehicle device includes a door handle and a vehicle control device that is connected to the door handle such that the vehicle control device can control the door handle, the door handle being provided with an antenna that can transmit a predetermined signal and a sensor that can detect whether a finger or the like of a person comes into contact with the door handle.

SUMMARY

In the vehicle system described in JP 2012-154118 A, a wire through which a drive signal for driving the antenna is transmitted to the door handle from the vehicle control device and a wire through which the vehicle control device receives a detection signal from the door handle are the same wire, the detection signal being output based on contact detection performed by the sensor.

However, according to the above-described configuration, the vehicle control device cannot receive the detection signal from the door handle through the wire while the drive signal is being transmitted to the door handle from the vehicle control device. Therefore, when a timing at which the sensor detects a user operation (door locking operation/unlocking operation) and a timing at which the antenna is driven overlap each other, the receiving of the detection signal by the vehicle control device is late so that a period of time between when the user operation is performed and when a vehicle operation (locking/unlocking of vehicle door) is performed is lengthened.

That is, a device is configured not to process transmitting of the drive signal to the antenna and reception of the detection signal from the sensor cannot at the same time, when the timing at which the sensor detects a user operation and the timing at which the antenna is driven overlap each other, the transmission of the drive signal and the reception of the detection signal collide with each other so that a period of time between when the user operation is performed and when the vehicle operation corresponding to the user operation is performed is lengthened.

The disclosure provides a vehicle control device with which it is possible to suppress a period of time between when a user operation is performed and when a vehicle operation corresponding to the user operation is performed being lengthened when a timing at which a sensor detects the user operation and a timing at which an antenna is driven overlap with each other.

A first aspect of the disclosure relates to a vehicle control device connected to a vehicle device that includes an antenna and a sensor detection unit configured to detect a user operation, the vehicle control device being configured to perform transmission of a drive signal for driving the antenna and reception of a detection signal output from the sensor detection unit by a common wire. The vehicle control device includes an antenna driving unit, a sensor detection signal determination unit, and a controller. The antenna driving unit is configured to control the antenna to transmit a radio signal by transmitting the drive signal to the vehicle device. The sensor detection signal determination unit is configured to perform a determination process of determining a vehicle operation corresponding to a detection signal received from the vehicle device. The controller is configured to control the antenna driving unit to transmit the drive signal. The controller is configured to determine whether the determination process is being performed by the sensor detection signal determination unit each when the antenna driving unit transmits the drive signal. The controller is configured to control the antenna driving unit to transmit the drive signal when the controller determines that the determination process is not being performed by the sensor detection signal determination unit. The controller is configured to control the antenna driving unit to transmit the drive signal after the sensor detection signal determination unit finishes the determination process when the controller determines that the determination process is being performed by the sensor detection signal determination unit.

In the vehicle control device according to the first embodiment of the disclosure, determination is made on whether the determination process of determining the vehicle operation corresponding to the detection signal output from the vehicle device is being performed or not each when the antenna driving unit transmits the drive signal. Therefore, the vehicle control device determine whether reception of the detection signal from the sensor detection unit and transmission of the drive signal to the antenna collide with each other. In the vehicle control device, when the determination process of determining the vehicle operation corresponding to the detection signal is being performed, transmission of the drive signal is performed after the determination process is finished.

With the above-described control, finishing the determination process in the sensor detection signal determination unit is given priority even when the timing of transmission of the drive signal that is performed by the antenna driving unit is reached while the determination process of determining the vehicle operation is being performed by the sensor detection signal determination unit. Therefore, the sensor detection signal determination unit can reliably determine the vehicle operation corresponding to the detection signal. Accordingly, it is possible to suppress a period of time between when a user operation is performed and when a vehicle operation corresponding to the user operation is performed being lengthened according to a device configured to transmit the drive signal and to receive the detection signal via the common wire.

In the vehicle control device according to the first aspect of the disclosure, the controller may be configured to temporarily stop the antenna driving unit to transmit the drive signal for performing the determination process and to give priority to reception of the detection signal from the sensor detection unit, when a process of transmitting the drive signal from the antenna driving unit takes place while the controller receives the detection signal from the sensor detection unit.

A second aspect of the disclosure relates to a vehicle control device connected to a vehicle device that includes an antenna and a sensor detection unit configured to detect a user operation, the vehicle control device being configured to perform transmission of a plurality of kinds of drive signals for driving the antenna and reception of a detection signal output from the sensor detection unit by using a common wire. The vehicle control device includes an antenna driving unit, a sensor detection signal determination unit, and a controller. The antenna driving unit is configured to control the antenna to transmit a radio signal by transmitting the drive signals to the vehicle device according to a predetermined procedure. The sensor detection signal determination unit is configured to perform a determination process of determining a vehicle operation corresponding to a detection signal received from the vehicle device. The controller is configured to control the antenna driving unit such that two or more kinds of drive signals among the drive signals are transmitted with a time interval provided between transmission of a drive signal that is transmitted immediately before the two or more kinds of drive signals are transmitted and transmission of the two or more kinds of drive signals, the time interval being equal to or longer than a time that is required for the sensor detection signal determination unit to finish the determination process.

In the vehicle control device according to the second aspect of the disclosure, control may be performed such that two or more kinds of drive signals among the drive signals are transmitted with a time interval provided between transmission of a drive signal that is transmitted to the vehicle device immediately before the two or more kinds of drive signals are transmitted and transmission of the two or more kinds of drive signals, the time interval being equal to or longer than a time that is needed for the sensor detection signal determination unit to finish the determination process.

In the vehicle control device according to the second aspect of the disclosure, the drive signals may include a first drive signal for transmission of a first radio signal from the antenna, a second drive signal for transmission of a second radio signal from the antenna after reception of an affirmative response to the first radio signal, and a third drive signal for transmission of a third radio signal from the antenna after reception of an affirmative response to the second radio signal. The controller may be configured to control the antenna driving unit such that a time interval between transmission of the first drive signal and transmission of the second drive signal and a time interval between transmission of the second drive signal and transmission of the third drive signal become equal to or longer than a time that is required for the sensor detection signal determination unit to finish the determination process.

With the above-described control, a time interval between transmission of one drive signal and transmission of the next drive signal can be set to be equal to or longer than a time that is required for the sensor detection signal determination unit to finish the determination process of determining the vehicle operation corresponding to the detection signal received by the sensor detection signal determination unit. Accordingly, even when reception of the first detection signal is interrupted and fails since the reception overlaps with transmission of the drive signal, reception of the next detection signal is certainly succeeded. Accordingly, it is possible to suppress a period of time between when a user operation is performed and when a vehicle operation corresponding to the user operation is performed being lengthened according to the device configured to transmit the drive signal and to receive the detection signal via the common wire.

In the vehicle control device according to any one of the aspects of the disclosure, the sensor detection signal determination unit may be configured to receive a signal that is output when a sensor is touched with a finger of a person as the detection signal. In the vehicle control device according to any one of the aspects of the disclosure, the sensor detection signal determination unit may be configured to receive a signal corresponding to a vehicle door locking operation and a signal corresponding to a vehicle door unlocking operation as the detection signal.

As described above, with the vehicle control device according to the aspects of the disclosure, it is possible to suppress a period of time between when a user operation is performed and when a vehicle operation corresponding to the user operation is performed being lengthened when a timing at which a sensor detects the user operation and a timing at which an antenna is driven overlap with each other.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4A is a timing chart of communication control performed in a vehicle system in the related art;

FIG. 4B is a timing chart of the communication control performed by the vehicle control device according to the first embodiment;

DETAILED DESCRIPTION OF EMBODIMENTS

Outline

An aspect of the disclosure relates to a vehicle control device that performs transmission of a drive signal for driving an antenna and reception of a detection signal, which is output when a sensor detects a user operation, by using the same wire. In the vehicle control device, a drive signal transmission timing is controlled such that a time period between when a user operation is performed with respect to the sensor and when a vehicle operation corresponding to the user operation is performed being lengthened is suppressed.

Outline of Vehicle System

Figure 1:
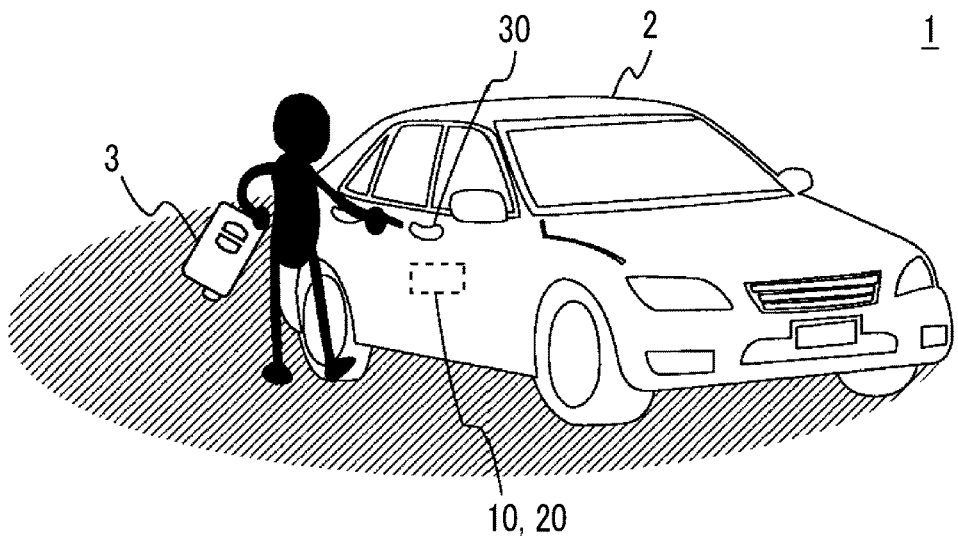
FIG. 1 is a schematic configuration view of a vehicle system that includes a vehicle control device according to an aspect of the disclosure.

FIG. 1 is a view for describing the outline of a vehicle system 1 that includes a vehicle control device 10 according to an embodiment or a vehicle control device 20 according to an embodiment. The vehicle system 1 illustrated in FIG. 1 is configured to include the vehicle control device 10 or the vehicle control device 20 installed in a vehicle 2, a vehicle device 30 with which the vehicle 2 is equipped, and an electronic key 3 that is carried by a user or the like.

The vehicle system 1 is a so-called smart entry system (also called electronic key system, wireless key system, keyless entry system, or like) in which authentication is performed between the vehicle 2 (in-vehicle device or like) and the electronic key 3 by using an identifier unique to the key such that a predetermined vehicle operation (locking or unlocking of vehicle door, start of engine, or like) is realized without a mechanical key operation. In the smart entry system, wireless communication for the authentication, which is performed by using the identifier, is performed as follows.

First, the vehicle control device 10 or the vehicle control device 20 intermittently transmits a radio signal (hereinafter, referred to as "Wake signal") for searching for the electronic key 3 to the vicinity of the vehicle (hashed portion in FIG. 1) at predetermined intervals by using an antenna (not shown) built into the vehicle device 30 (polling control). When the electronic key 3 receives the Wake signal, the electronic key 3 transmits an acknowledge signal (ACK signal), which is an affirmative response, to the vehicle 2 in response to the Wake signal.

Next, when the vehicle 2 receives the ACK signal with respect to the Wake signal, the vehicle control device 10 or the vehicle control device 20 determines that an electronic key is present in the vicinity of the vehicle. The vehicle control device 10 or the vehicle control device 20 transmits a radio signal (hereinafter, referred to as "command signal") for inquiring whether the electronic key is an electronic key (electronic key assigned based on the manufacturer, kind of vehicle, year of production, or the like) that corresponds to the vehicle 2 or not to the vicinity of the vehicle by using the antenna built into the vehicle device 30. When the electronic key 3 corresponding to the vehicle 2 receives the command signal, the electronic key 3 transmits the ACK signal, which is an affirmative response, to the vehicle 2 in response to the command signal.

Furthermore, when the vehicle 2 receives the ACK signal with respect to the command signal, the vehicle control device 10 or the vehicle control device 20 determines that the electronic key 3 corresponding to the vehicle 2 is present in the vicinity of the vehicle. The vehicle control device 10 or the vehicle control device 20 transmits a radio signal (hereinafter, referred to "challenge signal") for authenticating the electronic key 3 as an authorized electronic key (electronic key that is registered in vehicle 2 in advance) to the vicinity of the vehicle by using the antenna built into the vehicle device 30. When the electronic key 3 corresponding to the vehicle 2 receives the challenge signal, the electronic key 3 transmits a response signal to the vehicle 2 in response to the challenge signal, the response signal including identification information unique to the key.

When the vehicle 2 receives the response signal from the electronic key 3, the vehicle control device 10 or the vehicle control device 20 collates the identification information included in the response signal with identification information that is registered in the vehicle 2 in advance. When the collation is succeeded, the electronic key 3 transmitting the response signal in response to the challenge signal is authenticated as an authorized electronic key. The user carrying the authenticated electronic key 3 can perform a vehicle operation through a touch sensor or the like (not shown) installed in the vehicle device 30. The above-described wireless communication using the Wake signal, the command signal, and the challenge signal is continued even after the electronic key 3 is authenticated.

Hereinafter, communication control that is performed between the vehicle control device 10 or the vehicle control device 20 and the vehicle device 30 in the vehicle system 1 in which the wireless communication using the Wake signal, the command signal, and the challenge signal is performed will be described. The wireless communication using the Wake signal, the command signal, and the challenge signal is merely an example and the electronic key 3 may be authenticated via a wireless communication method using another signal or another transmission procedure.

First Embodiment

Figure 2:
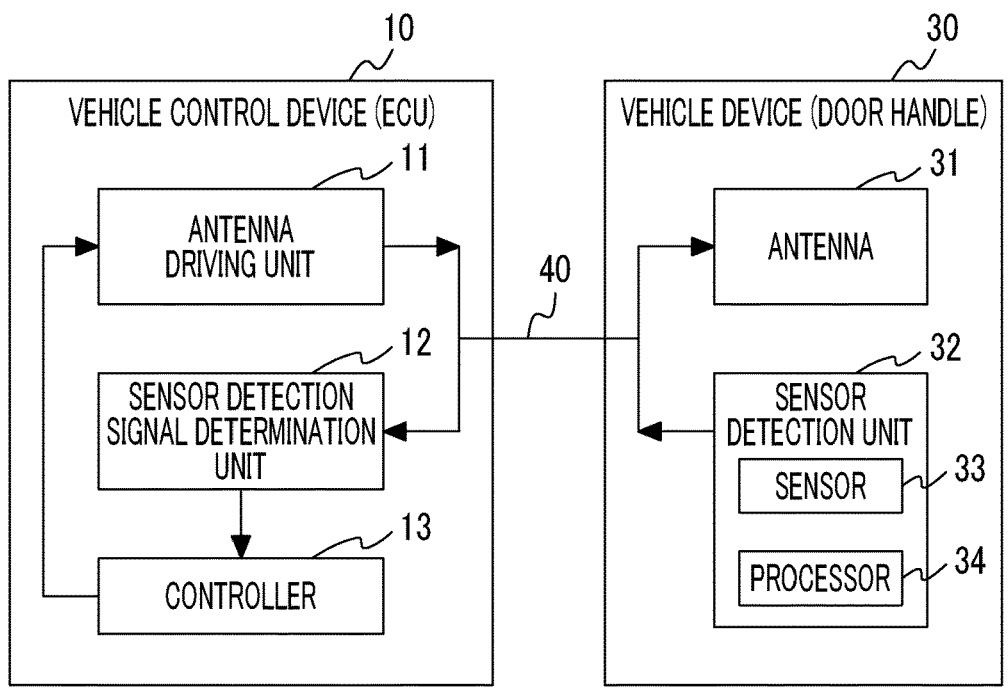
FIG. 2 is a diagram illustrating an example of the configurations of a vehicle control device and a vehicle device according to a first embodiment.

FIG. 2 is a diagram for schematically describing the configurations of the vehicle control device 10 and the vehicle device 30 according to a first embodiment. The vehicle control device 10 and the vehicle device 30 are connected to each other via a wire 40.

Configuration of Vehicle Control Device

The vehicle control device 10 according to the first embodiment, which is illustrated on the left side in FIG. 2, is provided with an antenna driving unit 11, a sensor detection signal determination unit 12, and a controller 13.

The antenna driving unit 11 can generate a drive signal for driving an antenna 31 of the vehicle device 30, which will be described later, based on an instruction from the controller 13. The drive signal is, for example, an alternating current voltage. The antenna driving unit 11 transmits the generated drive signal to the antenna 31 of the vehicle device 30 via the wire 40.

The antenna driving unit 11 according to the first embodiment generates and transmits three kinds of drive signals. The three kinds of drive signals are a drive signal (hereinafter, referred to as "first drive signal") for transmission of the Wake signal from the antenna 31, a drive signal (hereinafter, referred to as "second drive signal") for transmission of the command signal, and a drive signal (hereinafter, referred to as "third drive signal") for transmission of the challenge signal.

The sensor detection signal determination unit 12 can perform a determination process of determining the vehicle operation corresponding to a detection signal while receiving the detection signal from a sensor detection unit 32 of the vehicle device 30 (which will be described later) via the wire 40. Specifically, in a case where the detection signal is transmitted in the form of codes, the sensor detection signal determination unit 12 analyzes all codes in the detection signal to determine a vehicle operation indicated by the codes, that is, the vehicle operation corresponding to the detection signal. An electronic control unit (not shown) or the like corresponding to the determined vehicle operation is appropriately notified of the determined vehicle operation.

The controller 13 manages the timing of transmission of the drive signal which is performed by the antenna driving unit 11. The controller 13 can determine whether a determination process of determining the vehicle operation corresponding to the detection signal is being performed by the sensor detection signal determination unit 12. The controller 13 can control the timing of transmission of the drive signal which is performed by the antenna driving unit 11 in accordance with a determination that the determination process is being performed by the sensor detection signal determination unit 12. The contents of the above-described control will be described later.

Typically, all or a portion of the antenna driving unit 11, the sensor detection signal determination unit 12, and the controller 13 can be configured as an electronic control unit (ECU) including a central processing unit (CPU), a memory, an input and output interface, and the like. In the electronic control unit, a predetermined function is realized when the CPU reads and executes a predetermined program stored in the memory.

Configuration of Vehicle Device

The vehicle device 30 illustrated on the right side in FIG. 2 is provided with the antenna 31 and the sensor detection unit 32. In the first embodiment, an example in which the vehicle device 30 is installed in a door handle (not shown) is described. However, the vehicle device 30 may be installed in a place other than the door handle.

The antenna 31 can transmit a predetermined signal via a radio wave having a predetermined frequency by receiving the drive signal from the antenna driving unit 11 of the vehicle control device 10 via the wire 40. In the first embodiment, the predetermined signal is the above-described Wake signal, the command signal, or the challenge signal. The predetermined frequency may be a low frequency (LF). The antenna 31 can be configured with, for example, an LC resonant circuit obtained by connecting an inductor and a capacitor to each other in series and an LF radio wave can be transmitted when an alternating current voltage as the drive signal is applied to the opposite ends of the LC resonant circuit.

The sensor detection unit 32 can detect a user operation performed with respect to the vehicle device 30 and can transmit a detection signal corresponding to the detected user operation to the vehicle control device 10 via the wire 40. The sensor detection unit 32 includes a sensor 33 and a processor 34.

The sensor 33 is installed in the outermost layer of the door handle and the sensor 33 can detect a user operation performed by the user or the like. As the sensor 33, for example, a touch switch that detects a change in static capacitance which occurs due to contact with a finger or the like of a person (contact with human body), a button switch that detects point contact by means of a pressure, or the like can be used.

Typically, in the door handle, a sensor that detects a user operation (hereinafter, referred to as "locking operation") of locking a vehicle door and a sensor that detects a user operation (hereinafter, referred to as "unlocking operation") of unlocking the vehicle door are provided as the sensor 33.

The processor 34 can determine an operation performed by the user or the like based on the result of sensor detection which is performed when a finger of a person comes into contact or the like with the sensor 33 and the processor 34 can generate a detection signal according to the determination. For example, in a case where the processor 34 determines that the locking operation is performed based on detection performed by the sensor 33, the processor 34 generates a detection signal indicating the locking operation. In a case where the processor 34 determines that the unlocking operation is performed based on detection performed by the sensor 33, the processor 34 generates a detection signal indicating the unlocking operation. The detection signal can be generated using, for example, a start bit indicating the start of the signal and a code having a predetermined length which is a combination of high and low levels specifying a vehicle operation. The start bit is not essential.

The processor 34 transmits the detection signal which is generated based on the result of the detection performed by the sensor 33 to the sensor detection signal determination unit 12 of the vehicle control device 10 via the wire 40. While a user operation is being detected by the sensor 33, a code specifying the vehicle operation corresponding to the user operation is intermittently and repeatedly transmitted. At this time, the processor 34 can determine whether the antenna 31 is transmitting a radio signal after receiving the drive signal from the antenna driving unit 11 of the vehicle control device 10 and the processor 34 can transmit the detection signal within a predetermined period in which the antenna 31 does not transmit the radio signal.

A power source (direct current voltage) for operating the sensor detection unit 32 may be supplied by the vehicle device 30, may be supplied from the vehicle control device 10 through the wire 40, and may be supplied from a power supply device (not shown) or the like through a wire other than the wire 40.

Communication Control Performed by Vehicle Control Device

Figure 3:
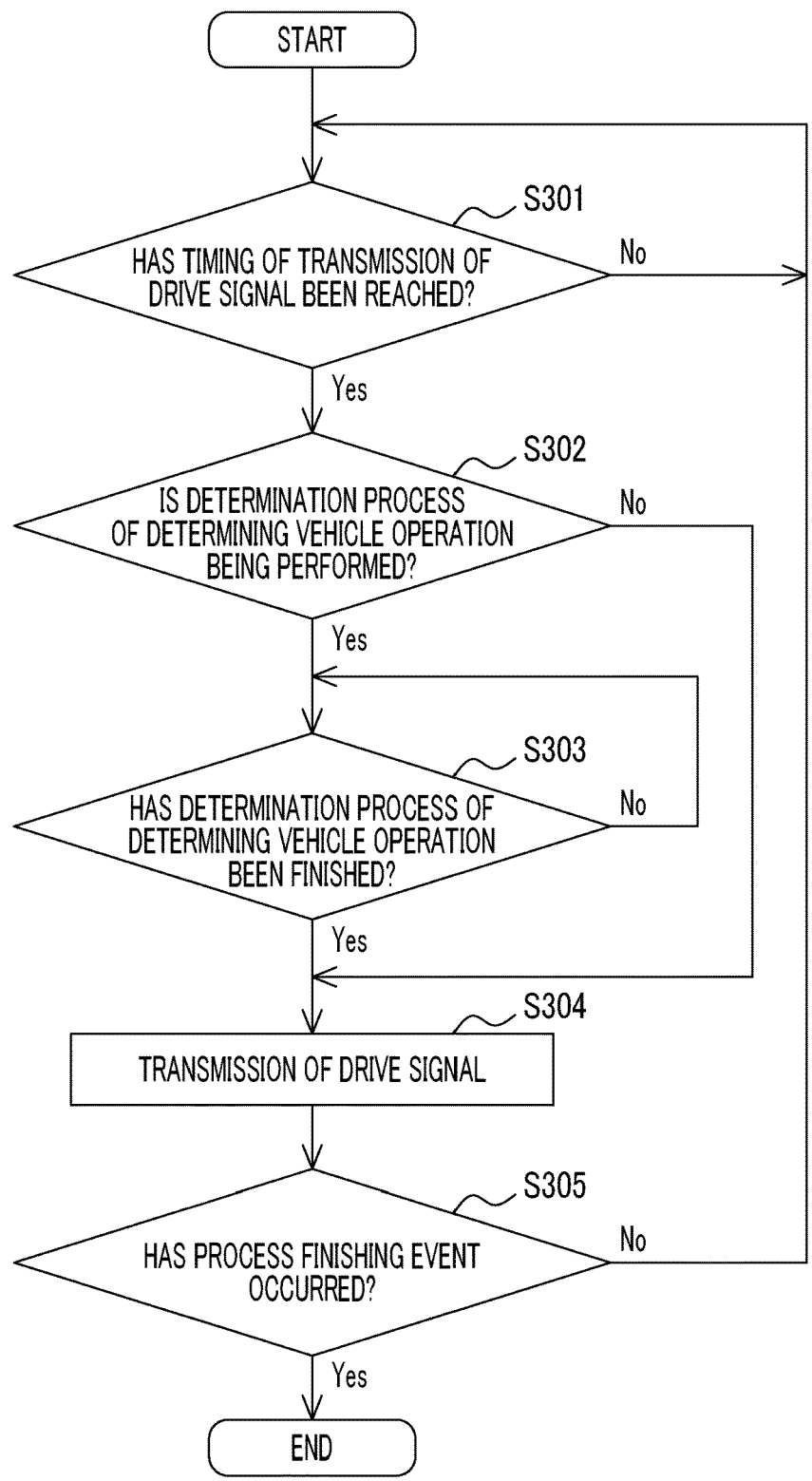
FIG. 3 is a flowchart of communication control performed by the vehicle control device according to the first embodiment.

FIG. 3 is a flowchart for describing the procedure of communication control performed by the vehicle control device 10 according to the first embodiment.

In a process of step S301, the controller 13 of the vehicle control device 10 determines whether the timing of transmission of the drive signal which is performed by the antenna driving unit 11 has been reached or not. When the controller 13 determines that the timing of transmission of the drive signal has been reached (S301, Yes), the process proceeds to step S302. Meanwhile, in a case where the controller 13 determines that the timing of transmission of the drive signal has not been reached (S301, No), the determination in step S301 is continuously performed until the timing of transmission of the drive signal is reached.

In a process of step S302, the controller 13 of the vehicle control device 10 determines whether the determination process of determining the vehicle operation corresponding to the detection signal received from the vehicle device 30 is being performed by the sensor detection signal determination unit 12. In a case where the controller 13 determines that the process of determining the vehicle operation is being performed by the sensor detection signal determination unit 12 (S302, Yes), the process proceeds to step S303. Meanwhile, in a case where the controller 13 determines that the determination process of determining the vehicle operation is not being performed by the sensor detection signal determination unit 12 (S302, No), the process proceeds to step S304.

In a process of step S303, the controller 13 of the vehicle control device 10 determines whether the determination process of determining the vehicle operation corresponding to the detection signal, which is performed by the sensor detection signal determination unit 12, has been finished. In a case where the controller 13 determines that the determination process of determining the vehicle operation has been finished (S303, Yes), the process proceeds to step S304. Meanwhile, in a case where the controller 13 determines that the determination process of determining the vehicle operation has not been finished, the process returns to step S303 and the controller 13 waits for the determination process of determining the vehicle operation to be finished. Here, the expression "a time point at which the determination process of determining the vehicle operation is finished" may mean a time point at which a series of determination processes performed by the sensor detection signal determination unit 12 is finished, a time point at which the determined vehicle operation is confirmed, or a time point at which the sensor detection unit 32 finishes reception of the detection signal.

In a process of step S304, the antenna driving unit 11 of the vehicle control device 10 transmits the drive signal to the antenna 31 of the vehicle device 30 via the wire 40. When the drive signal is transmitted, the process proceeds to step S305.

In a process of step S305, determination is made on whether a predetermined event, which results in the necessity of finishing the communication control performed by the vehicle control device 10, has occurred. Examples of the predetermined event include a case where the vehicle is not used for a long period of time and enters a power saving mode. In a case where the determination is made that the predetermined event has occurred, the flow process is terminated. Meanwhile, in a case where the determination is made that the predetermined event has not occurred, the process returns to step S301 and the controller 13 waits for the timing of transmission of the drive signal.

A process in the above-described communication control will be described using timing charts in FIGS. 4A and 4B. FIGS. 4A and 4B are timing charts for describing communication control (FIG. 4B) performed in the vehicle system 1 configured to include the vehicle control device 10 according to the first embodiment while comparing the communication control performed in the vehicle system 1 with communication control (FIG. 4A) performed in a vehicle system in the related art.

In FIGS. 4A and 4B, a case where a process of transmitting the command signal from the antenna 31 takes place during a period for which the detection signal is transmitted from the sensor detection unit 32 based on the user operation (unlocking operation) is used as an example. In a case where a process of transmitting the Wake signal or the challenge signal takes place, the same control is performed.

In the communication control in the related art which is illustrated in FIG. 4A, in a case where the process of transmitting the command signal takes place during transmission of the detection signal, transmission of the second drive signal from the antenna driving unit 11 is given priority and transmission of the detection signal from the sensor detection unit 32 is terminated in the middle of the transmission (x mark in FIG. 4A). Therefore, the sensor detection signal determination unit 12 cannot receive the entire unlocking code that is included in the detection signal and that specifies the unlocking operation, the determination process of determining the vehicle operation in the sensor detection signal determination unit 12 is interrupted, and thus the vehicle operation cannot be determined (unlocking is not confirmed).

After transmission of the command signal is terminated, the sensor detection unit 32 transmits the detection signal again in a case where the user operation is detected (door handle is touched). However, the process of transmitting the challenge signal takes place and the third drive signal is transmitted in the middle of re-transmission of the detection signal as well, and thus transmission of the detection signal from the sensor detection unit 32 is terminated in the middle of the transmission. Therefore, the sensor detection signal determination unit 12 cannot receive the entire unlocking code even at the time of the re-transmission, and thus the vehicle operation cannot be determined (unlocking is not confirmed).

After transmission of the challenge signal is terminated, the sensor detection unit 32 transmits the detection signal once more in a case where the user operation is still detected. During a period in which the detection signal is transmitted once more, transmission of a signal does not take place and the drive signal is not transmitted. Therefore, the sensor detection signal determination unit 12 can receive the entire unlocking code, and thus the determination process of determining the vehicle operation can be finished (unlocking is confirmed).

As described above, in the case of the communication control in the related art, a period of time between when the unlocking operation is performed first and when the vehicle door is actually unlocked is long and a response to operation input performed by the user is delayed.

However, in the communication control according to the first embodiment that is illustrated in FIG. 4B, in a case where the process of transmitting the command signal takes place in the middle of transmission of the detection signal, transmission of the second drive signal from the antenna driving unit 11 is temporarily stopped and reception of the detection signal from the sensor detection unit 32 is given priority. The transmission of the second drive signal is performed after the sensor detection signal determination unit 12 receives the entire unlocking code and the determination process of determining the vehicle operation is finished (unlocking is confirmed).

As described above, in the case of the communication control according to the first embodiment, the vehicle door is immediately unlocked in response to the unlocking operation being performed first. Therefore, it is possible to avoid a response to the operation input performed by the user being delayed.

Operation and Effect

As described above, in the vehicle control device 10 according to the first embodiment, determination is made on whether the determination process of determining the vehicle operation corresponding to the detection signal received from the vehicle device 30 is being performed by the sensor detection signal determination unit 12 each time the timing of transmission of the drive signal from the antenna driving unit 11 to the vehicle device 30 is reached. In the vehicle control device 10, in a case where the determination is made that the determination process of determining the vehicle operation is being performed, transmission of the drive signal from the antenna driving unit 11 to the vehicle device 30 is performed after the determination process in the sensor detection signal determination unit 12 is finished in order to avoid collision between reception of the detection signal from the sensor detection unit 32 and transmission of the drive signal to the antenna 31.

With the above-described control, reception of the detection signal in the sensor detection signal determination unit 12 is given priority even when the timing of transmission of the drive signal from the antenna driving unit 11 to the vehicle device 30 is reached while the determination process of determining the vehicle operation corresponding to the detection signal is being performed by the sensor detection signal determination unit 12. Therefore, the sensor detection signal determination unit 12 can reliably determine the vehicle operation corresponding to the detection signal. Accordingly, it is possible to suppress a period of time between when a user operation is performed and when a vehicle operation corresponding to the user operation is performed being lengthened in a device configuration in which transmission of the drive signal and reception of the detection signal are performed via the same wire.

Second Embodiment

Figure 5:
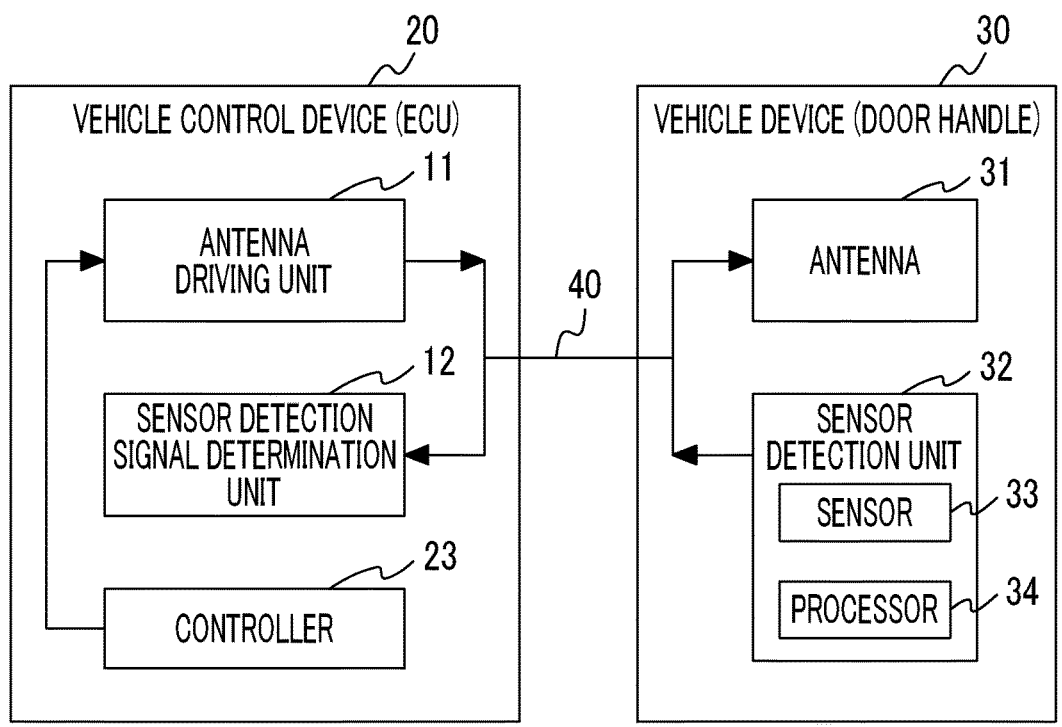
FIG. 5 is a diagram illustrating an example of the configurations of a vehicle control device and a vehicle device according to a second embodiment.

FIG. 5 is a diagram for schematically describing the configurations of the vehicle control device 20 and the vehicle device 30 according to a second embodiment. The vehicle control device 20 and the vehicle device 30 are connected to each other via the wire 40. The configuration of a controller 23 in the vehicle control device 20 in the second embodiment is different from that in the first embodiment. Therefore, hereinafter, the description will be made focusing on the configuration of the controller 23 and the other components are given the same reference numerals as in the first embodiment and will not be described.

Configuration of Vehicle Control Device

The vehicle control device 20 according to the second embodiment, which is illustrated on the left side in FIG. 5, is provided with the antenna driving unit 11, the sensor detection signal determination unit 12, and the controller 23.

The antenna driving unit 11 can generate a plurality of kinds of drive signals for driving the antenna 31 of the vehicle device 30 based on an instruction from the controller 23. In the second embodiment, three drive signals are generated. The three drive signals are a first drive signal, a second drive signal, and a third drive signal. The antenna driving unit 11 transmits the generated drive signals to the antenna 31 of the vehicle device 30 through the wire 40 according to a predetermined procedure. In the second embodiment, the predetermined procedure is a procedure in which the second drive signal is transmitted after the first drive signal is transmitted, the third drive signal is transmitted after the second drive signal is transmitted, and the first drive signal is transmitted after the third drive signal is transmitted.

The controller 23 manages the timing of transmission of the drive signals that is performed by the antenna driving unit 11. Specifically, the controller 23 controls the antenna driving unit 11 such that two or more kinds of drive signals among the above-described drive signals are transmitted with a time interval provided between transmission of a drive signal that is transmitted immediately before the two or more kinds of drive signals are transmitted and transmission of the two or more kinds of drive signals, the time interval being equal to or longer than time T that is needed for the sensor detection signal determination unit 12 to finish the determination process.

For example, in a case where the two or more kinds of drive signals (hereinafter, referred to as "target to be controlled") are the second drive signal (command signal) and the third drive signal (challenge signal), the controller 23 can control the antenna driving unit 11 such that a time interval between transmission of the first drive signal (Wake signal) that is transmitted immediately before the second drive signal is transmitted and transmission of the second drive signal and a time interval between transmission of the second drive signal that is transmitted immediately before the third drive signal is transmitted and transmission of the third drive signal become equal to or longer than time T described above at all times. In a case where the target to be controlled is the first drive signal, the antenna driving unit 11 is controlled such that a time interval between transmission of the third drive signal and transmission of the first drive signal becomes equal to or longer than time T described above.

The Wake signal functions as a polling signal and is considered to be set to be periodically transmitted at sufficient time intervals in advance. Therefore, there may be a case where the antenna driving unit 11 may not be controlled such that a time interval between transmission of the third drive signal and transmission of the first drive signal becomes equal to or longer than time T. In this case, when the second drive signal (command signal) and the third drive signal are set as the targets to be controlled, all of the drive signals are transmitted at time intervals equal to or longer than time T described above.

Figure 6:
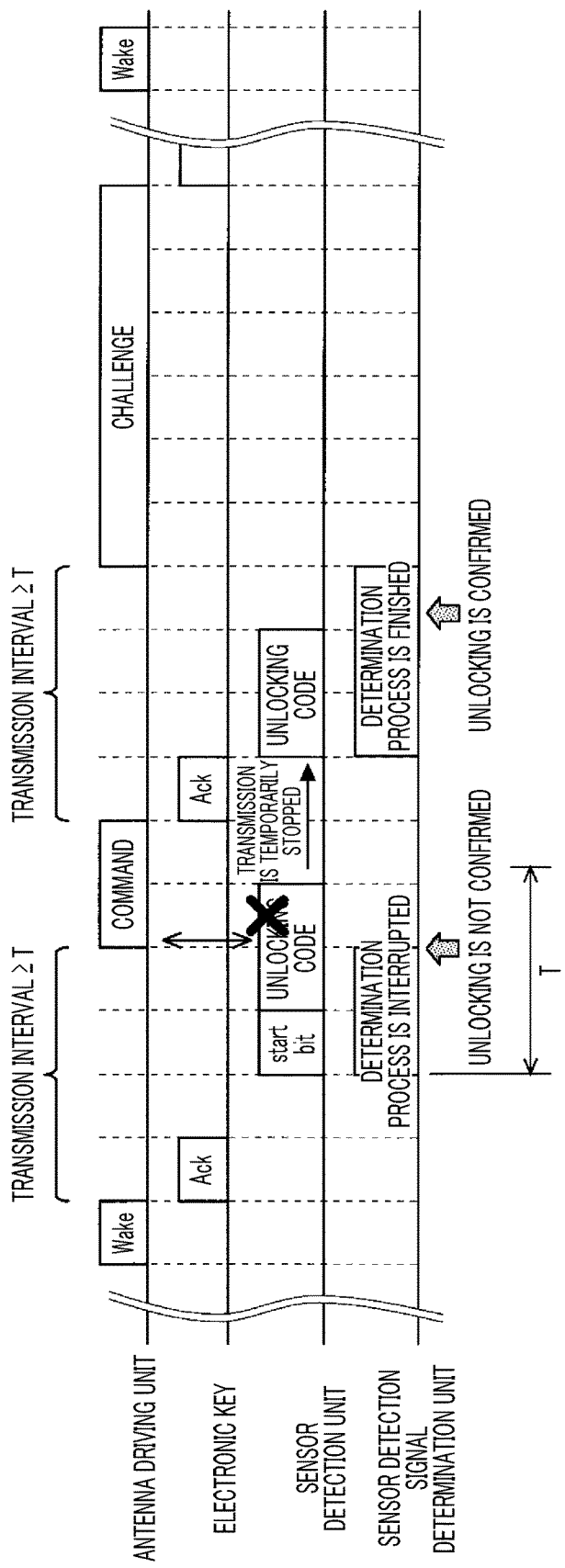
FIG. 6 is a timing chart of communication control performed by the vehicle control device according to the second embodiment.

A process in the above-described communication control will be described by using a timing chart in FIG. 6. FIG. 6 is a timing chart for describing communication control performed in the vehicle system 1 configured to include the vehicle control device 20 according to the second embodiment.

In FIG. 6, a time interval between transmission of the command signal and transmission of the challenge signal, that is, a time interval between transmission of the second drive signal and transmission of the third drive signal is equal to or longer than time T. Therefore, in a period of re-transmission of the detection signal of which transmission is terminated in the middle of the first transmission due to the process of transmitting the command signal, the process of transmitting the challenge signal does not take place. Accordingly, the sensor detection signal determination unit 12 can receive the entire unlocking code, and thus the determination process of determining the vehicle operation can be finished (unlocking is confirmed).

As described above, in the case of the communication control according to the second embodiment, even in a case where transmission of the detection signal that is transmitted first in accordance with the unlocking operation being performed is terminated in the middle of the transmission, the transmission is certainly finished in the re-transmission and the vehicle door is unlocked. Therefore, it is possible to minimize a time by which a response to operation input performed by the user is delayed.

Operation and Effect

As described above, in the vehicle control device 20 according to the second embodiment, the antenna driving unit is controlled such that two or more kinds of drive signals (for example, command signal and challenge signal) among a plurality of kinds of drive signals (for example, Wake signal, command signal, and challenge signal) are transmitted with a time interval provided between transmission of a drive signal that is transmitted immediately before the two or more kinds of drive signals are transmitted and transmission of the two or more kinds of drive signals, the time interval being equal to or longer than time T that is needed for the sensor detection signal determination unit 12 to finish the determination process of determining the vehicle operation.

With the above-described control, a time interval between transmission of one drive signal and transmission of the next drive signal can be set to be equal to or longer than time T that is needed for the sensor detection signal determination unit 12 to finish the determination process of determining the vehicle operation corresponding to the detection signal received by the sensor detection signal determination unit 12. Accordingly, even in a case where reception of the first detection signal is interrupted and fails since the reception overlaps with transmission of the drive signal, the reception of the detection signal is certainly succeeded due to the re-transmission. Therefore, the sensor detection signal determination unit 12 can finish the determination process of determining the vehicle operation by properly receiving the detection signal (by receiving entire code) at least during the re-transmission. Accordingly, it is possible to suppress a period of time between when a user operation is performed and when a vehicle operation corresponding to the user operation is performed being lengthened in a device configuration in which transmission of the drive signal and reception of the detection signal are performed via the same wire.

The aspect of the disclosure can be used for a vehicle system or the like in which a vehicle is controlled through wireless communication between an in-vehicle device and an electronic key and is useful in a case where it is desired to suppress a time period between when detection is performed by a sensor and when a vehicle operation is performed being lengthened.

What is claimed is:

1. A vehicle control device connected to a vehicle device that includes an antenna and a sensor detection unit configured to detect a user operation, the vehicle control device being configured to perform transmission of a drive signal for driving the antenna and reception of a detection signal output from the sensor detection unit by a common wire, the vehicle control device comprising:
   an electronic control unit including:
      an antenna driving unit configured to control the antenna to transmit a radio signal by transmitting the drive signal to the vehicle device;
      a sensor detection signal determination unit configured to perform a determination process of determining a vehicle operation corresponding to a detection signal received from the vehicle device; and
      a controller configured to:
      determine whether the determination process is being performed by the sensor detection signal determination unit when the antenna driving unit transmits the drive signal,
      control the antenna driving unit to transmit the drive signal upon determining that the determination process is not being performed by the sensor detection signal determination unit, and
      control the antenna driving unit to transmit the drive signal after the sensor detection signal determination unit finishes the determination process upon determining that the determination process is being performed by the sensor detection signal determination unit.

2. The vehicle control device according to claim 1, wherein the controller is configured to temporarily stop the antenna driving unit to transmit the drive signal for performing the determination process and to give priority to reception of the detection signal from the sensor detection unit, when a process of transmitting the drive signal from the antenna driving unit takes place while the controller receives the detection signal from the sensor detection unit.

3. The vehicle control device according to claim 1, wherein the sensor detection signal determination unit is configured to receive, as the detection signal, a signal that is output when a sensor is touched by a finger of a person.

4. The vehicle control device according to claim 3, wherein the sensor detection signal determination unit is configured to receive, as the detection signal, a signal corresponding to a vehicle door locking operation and an unlocking operation.

5. A vehicle control device connected to a vehicle device that includes an antenna and a sensor detection unit configured to detect a user operation, the vehicle control device being configured to perform transmission of a plurality of kinds of drive signals for driving the antenna and reception of a detection signal output from the sensor detection unit by using a common wire, the vehicle control device comprising:
   an electronic control unit including:
      an antenna driving unit configured to control the antenna to transmit a radio signal by transmitting the plurality of kinds of drive signals to the vehicle device according to a predetermined procedure;
      a sensor detection signal determination unit configured to perform a determination process of determining a vehicle operation corresponding to a detection signal received from the vehicle device; and
      a controller configured to control the antenna driving unit such that at least two kinds of drive signals of the plurality of drive signals are transmitted with a time interval provided between (i) a transmission of a drive signal that is transmitted immediately before the at least two kinds of drive signals of the plurality of drive signals and (ii) a transmission of the at least two kinds of drive signals, the time interval being equal to or greater than a time that is required for the sensor detection signal determination unit to finish the determination process.

6. The vehicle control device according to claim 5, wherein:
   the plurality of kinds of drive signals includes (i) a first drive signal for a transmission of a first radio signal from the antenna, (ii) a second drive signal for a transmission of a second radio signal from the antenna after a reception of an affirmative response of the first radio signal, and (iii) a third drive signal for a transmission of a third radio signal from the antenna after a reception of an affirmative response of the second radio signal; and
   the controller is configured to control the antenna driving unit such that a first time interval between the transmission of the first drive signal and the transmission of the second drive signal and a second time interval between the transmission of the second drive signal and the transmission of the third drive signal become equal to or greater than a time that is required for the sensor detection signal determination unit to finish the determination process.

7. The vehicle control device according to claim 5, wherein the sensor detection signal determination unit is configured to receive, as the detection signal, a signal that is output when a sensor is touched by a finger of a person.

8. The vehicle control device according to claim 7, wherein the sensor detection signal determination unit is configured to receive, as the detection signal, a signal corresponding to a vehicle door locking operation and an unlocking operation.

* * * * *